(12) United States Patent
Shiyanovskii et al.

(10) Patent No.: US 8,294,645 B2
(45) Date of Patent: Oct. 23, 2012

(54) LIQUID CRYSTAL DEVICE AND METHOD THEREOF

(75) Inventors: Sergij V. Shiyanovskii, Stow, OH (US); Mingxia Gu, San Jose, CA (US); Oleg D. Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 522 days.

(21) Appl. No.: 12/403,160

(22) Filed: Mar. 12, 2009

(65) Prior Publication Data

US 2009/0231260 A1   Sep. 17, 2009

Related U.S. Application Data

(60) Provisional application No. 61/035,938, filed on Mar. 12, 2008.

(51) Int. Cl.
*G09G 3/36* (2006.01)
*G02F 1/13* (2006.01)

(52) U.S. Cl. ............... 345/87; 345/94; 345/95; 349/170

(58) Field of Classification Search ............ 345/87, 345/94, 95, 97; 349/170
See application file for complete search history.

(56) References Cited

U.S. PATENT DOCUMENTS

| | | | | |
|---|---|---|---|---|
| 4,031,529 A * | 6/1977 | Borel et al. | ............... | 345/101 |
| 2003/0011551 A1* | 1/2003 | Takahashi et al. | ............... | 345/87 |
| 2004/0189680 A1* | 9/2004 | Feng et al. | ............... | 345/691 |
| 2005/0162416 A1* | 7/2005 | Bu et al. | ............... | 345/208 |

OTHER PUBLICATIONS

Deng-Ke Yang and Shin-Tson Wu, "Fundamentals of Liquid Crystal Devices," pp. 143-145, John Wiley & Sons, Ltd., 2006, New York.
Y. Yin, S. V. Shiyanovskii, A. B. Golovin and O. D. Lavrentovich, "Dielectric Torque and Orientation Dynamics of Liquid Crystals with Dielectric Dispersion," *Physical Review Letters* 95, pp. 087801-1-087801-4, 2005, The American Physical Society.
Mingxia Gu, Ye Yin, Sergij V. Shiyanovskii and Oleg D. Lavrentovich, "Effects of dielectric relaxation on the director dynamics of uniaxial nematic liquid crystals," *Physical Review E* 76, pp. 061702-1-061702-12, 2007, The American Physical Society.
N. J. Mottram and C. V. Brown, "Pulsed addressing of a dual-frequency nematic liquid crystal," *Physical Review E* 74, pp. 031703-1-031703-7, 2006, The American Physical Society.
Mingxia Gu, Ivan I. Smalyukh and Oleg D. Lavrentovich, "Directed vertical alignment liquid crystal display with fast switching," *Applied Physics Letters* 88, pp. 061110-1-061110-3, 2006, American Institute of Physics.

(Continued)

*Primary Examiner* — Quan-Zhen Wang
*Assistant Examiner* — Michael J Eurice
(74) *Attorney, Agent, or Firm* — Fay Sharpe LLP

(57) ABSTRACT

The invention provides a liquid crystal device and method thereof. Subsequent to applying a first electrical voltage on a liquid crystal to induce a reorientation of the liquid crystal, a second electrical voltage with proper polarity is applied on the liquid crystal to assist the relaxation of the reorientation that was induced by the first electrical voltage. The "switch-off" phase of the liquid crystal can therefore be accelerated or temporally shortened, and the device can exhibit better performance such as fast response to on/off signals. The invention can be widely used LCD, LC shutter, LC lens, spatial light modulator, telecommunication device, tunable filter, beam steering device, and electrically driven LC device, among others.

20 Claims, 5 Drawing Sheets

OTHER PUBLICATIONS

O. P. Pishnyak, S. Tang, J. R. Kelly, S. V. Shiyanovskii and Oleg D. Lavrentovich, "Levitation, Lift, and Bidirectional Motion of Colloidal Particles in an Electrically Driven Nematic Liquid Crystal," *Physical Review Letters 99*, pp. 127802-1-127802-4, 2007, The American Physical Society.

H.-G. Kreul, S. Urban and A. Würflinger, "Dielectric studies of liquid crystals under high pressure: Static permittivity and dielectric relaxation in the nematic phase of pentylcyanobiphenyl (5CB)," *Physical Review A*, vol. 45, No. 12, pp. 8624-8631, Jun. 15, 1992, The American Physical Society.

\* cited by examiner

LIQUID CRYSTAL DEVICE AND METHOD THEREOF

CLAIM OF PRIORITY

This application is based on and claims priority to U.S. Provisional Application Ser. No. 61/035,938, filed on Mar. 12, 2008, which is incorporated herein by reference in its entirety.

This invention was made with United States Government support under DOE Grant No. DE-FG02-06ER 46331 awarded by the Department of Energy. The Government may have has certain rights in this invention.

BACKGROUND OF THE INVENTION

The present exemplary embodiment relates to a liquid crystal (LC) device and method thereof. It finds particular application in conjunction with, for example, liquid crystal display (LCD), LC shutter, LC lens, spatial light modulator, telecommunication device, beam steering device, tunable filter, and other electrically driven LC devices, and will be described with particular reference thereto. However, it is to be appreciated that the present exemplary embodiment is also amenable to other electrooptical applications.

The reorientation of liquid crystal molecules such as nematic liquid crystal (NLC) molecules by an electric field E is used in many electrooptical applications such as Liquid Crystal displays (LCDs). Tremendous efforts have been made to improve the performance of LCDs, especially their switching time. As disclosed in D.-K. Yang and S. T. Wu, *Fundamentals of Liquid Crystal Devices* (John Wiley, New York, 2006), there are two phases in electric switching of a LCD. The fast "active" phase of "switch on" is driven by an applied voltage U with the characteristic time $\tau_{on} \approx \gamma_1 d^2/(\epsilon_0|\Delta\epsilon|U^2)$, wherein $\epsilon_0$ is the electric constant, d is the cell thickness, $\gamma_1$ is the rotational viscosity, $\Delta\epsilon = \epsilon_\parallel - \epsilon_\perp$ is the dielectric anisotropy, and $\epsilon_\parallel$ and $\epsilon_\perp$ are the principal dielectric permittivities referred to the director $\hat{n}$. The characteristic time $\tau_{on}$ can be decreased by increasing U. Director reorientation in the "switch off" phase is a "passive" process driven by relaxation of elastic distortions with switch-off time $\tau_{off} \approx \gamma_1 d^2/(\pi^2 K)$ that depends on the NLC properties such as $\gamma_1$ and the elastic constant K, but not on the pre-applied electric field. This consideration is based on a classic picture of a NLC as a medium with no dielectric dispersion and instant dielectric response; and the dielectric torque $M_d = \epsilon_0 \Delta\epsilon(E \cdot \hat{n}) E \times \hat{n}$ is quadratic in E and is determined by the present values of E and $\hat{n}$.

Later, frequency dependence of dielectric permittivity changed this notion. According to Y. Yin, et al. Phys. Rev. Lett. 95, 087801 (2005); M. Gu, et al. Phys. Rev. E 76, 061702 (2007); and N. J. Mottram and C. V. Brown, Phys. Rev. E 74, 031703 (2006), $M_d$ depends not only on the present E and $\hat{n}$, but also on their past values. This "dielectric memory effect" (DME) has been studied for so-called dual frequency NLCs in which $\Delta\epsilon$ changes sign with the frequency f of the applied voltage.

However, there is a continuous need in the art of LC device product and process in which the "switch-off" phase can be better controlled, for example, accelerated or temporally shortened, such that the device exhibits better performance such as fast response to on/off signals. Advantageously, the present invention provides a device and method thereof that addresses this need.

BRIEF DESCRIPTION OF THE INVENTION

One aspect of the invention provides a liquid crystal device comprising:
a liquid crystal cell,
a first electrical voltage generator, and
a second electrical voltage generator,
wherein said first electrical voltage generator generates a first electrical voltage which applies on the liquid crystal to induce a reorientation of the liquid crystal; and
said second electrical voltage generator generates a second electrical voltage which applies on the liquid crystal and assists the liquid crystal to relax from the reorientation induced by the first electrical voltage back to the initial field free state.

Another aspect of the invention provides a method for relaxing the liquid crystal in a liquid crystal cell, comprising:
(1) applying a first electrical voltage on the liquid crystal to induce a reorientation of the liquid crystal,
(2) removing the first electrical voltage to relax the liquid crystal from the reorientation induced by the first electrical voltage, and
(3) applying a second electrical voltage on the liquid crystal to assist the relaxation.

DETAILED DESCRIPTION OF THE INVENTION

Figure 1:
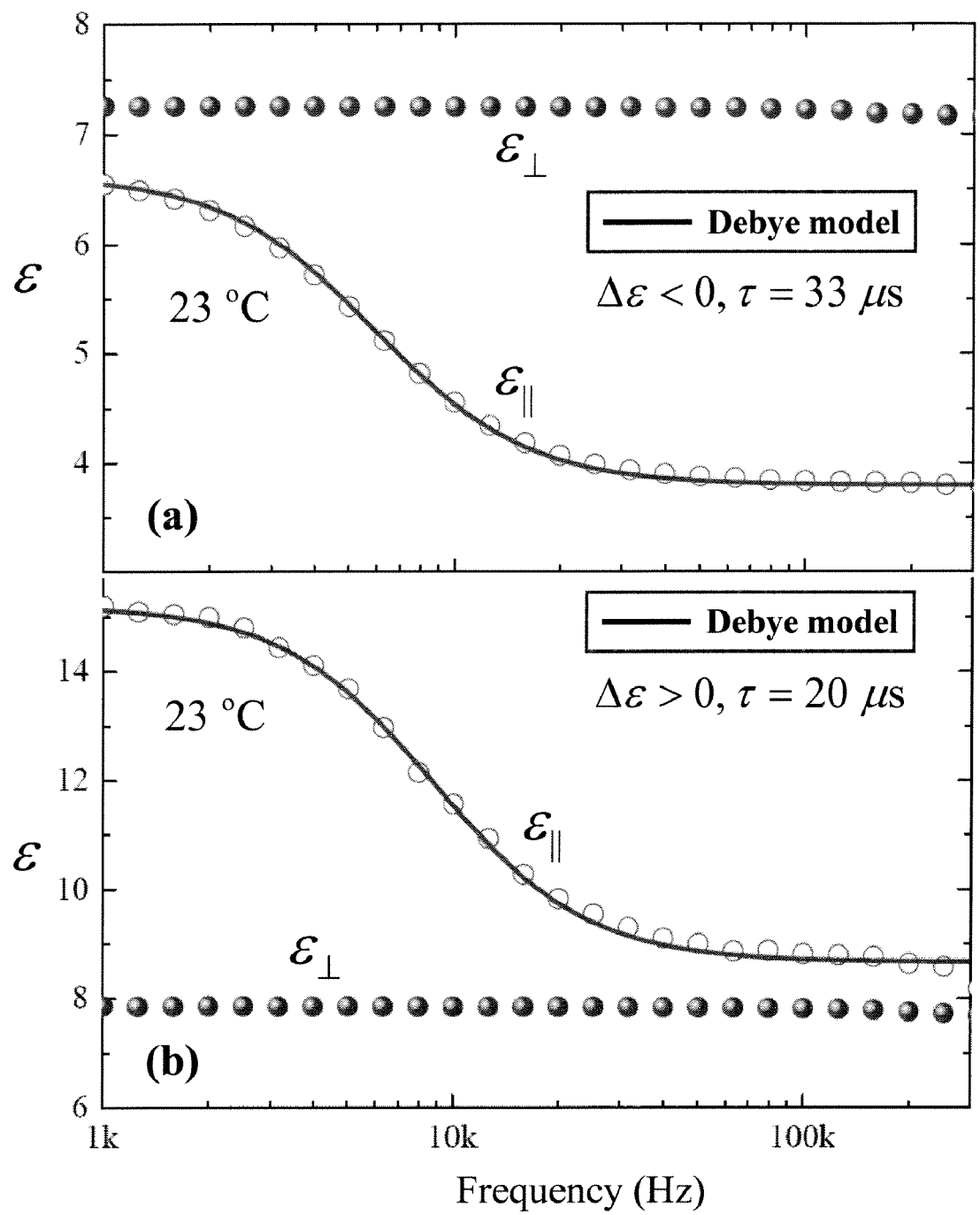
FIG. 1 shows the dielectric dispersions of a nematic liquid crystal sample with negative dielectric anisotropy $\Delta\epsilon$ (panel a) and a nematic liquid crystal sample with positive dielectric anisotropy $\Delta\epsilon$ (panel b) according to an embodiment of the invention.

In various embodiments, the liquid crystal is typically dielectrically dispersive, i.e., the dielectric anisotropy $\Delta\epsilon$ is dependent on the frequency of the applied electric field. The liquid crystal may exhibit negative or positive dielectric anisotropy $\Delta\epsilon$. In some embodiments, the $\Delta\epsilon$ absolute value may be as high as possible for maximizing the dielectric torque which is the driving force of liquid crystal reorientation. However, in other embodiments, high $\Delta\epsilon$ liquid crystals might have other physical properties such as high orientational viscosity, which is less preferred in some practical applications. The $\Delta\epsilon$ generally has an absolute value from about 0 to about 50, for example, from about 1 to about 10.

In typical embodiments, the liquid crystal comprises nematic liquid crystal (NLC). Examples of nematic liquid crystal with negative dielectric anisotropy $\Delta\epsilon$ include, but are not limited to, MLC-6608. MLC-6609, MLC-6610, MLC-6882, MLC-6883, MLC-6884, MLC-6885, a mixture of MLC-7026-100 and 2F-3333, and the like, and any combination thereof. Examples of nematic liquid crystal with positive dielectric anisotropy $\Delta\epsilon$ include, but are not limited to, 5CB (4-Cyano-4'-pentylbiphenyl, $CH_3-(CH_2)_4-C_6H_4-C_6H_4-CN$), octylcyanobiphenyl (8CB), MLC-6601, MLC-15900-100, a mixture of 5CB and MLC2048, a mixture of 5CB and 2F-3333, and the like, and any combination thereof. These NLCs may be chemically synthesized or obtained from commercial sources. For example, MLC-7026-100 may be obtained from EM Industries, and 2F-3333 may be obtained from Rolic Technologies.

Any suitable liquid crystal cell may be used in the invention, for example, it can be a homeotropic cell, a planar cell, or a high pretilt angle cell.

Any electrical voltage that can induce a reorientation of the liquid crystal may be used as the first electrical voltage. Its amplitude and duration are determined by the requirements of the device performance during the "voltage ON" state. For example, higher voltage increases the angle between the initial director orientation (induced, for example, by surface anchoring from the coated polyimides on the substrates) and the director orientation in the applied voltage. Typical values of voltage range from 1 V to 10 V in display applications such as flat panel TV panels, but might be as high as 100 V or more in other electrooptical applications of LCs.

In some preferred embodiments, while the liquid crystal has negative dielectric anisotropy $\Delta\epsilon$, the polarity of the first electrical voltage and the polarity of the second electrical voltage are the same.

In other preferred embodiments, while the liquid crystal has positive dielectric anisotropy $\Delta\epsilon$, the polarity of the first electrical voltage and the polarity of the second electrical voltage are opposite.

In some embodiments, the step of removing the first electrical voltage and the step of applying the second electrical voltage are simultaneous.

In some preferred embodiments, the time span between the step of removing the first electrical voltage and the step of applying the second electrical voltage is substantially zero. In these embodiments, to assist and to accelerate the reorientation of the director from the orientation determined by the first electric voltage to the orientation determined by the surface alignment in the voltage-free state, the switching OFF of the first voltage is accompanied by a simultaneous application of the second electric voltage with a profile designed to achieve a faster switching of the director.

In exemplary embodiments, the step of removing the first electrical voltage and starting of the application of the second electrical voltage is accomplished with the back edge of the first electrical voltage pulse. Such back edge can be for example an instantaneous back edge or an exponentially decaying back edge.

The first electrical voltage generator and the second electrical voltage generator of the invention may be separate devices; alternatively, they may be merged into one single device which can generate both the first and the second electrical voltages. The generator may be, for example, a pulse generator, a function generator, a wave-form generator, and the like, or any combination thereof. In one embodiment, the first electrical voltage generator and the second electrical voltage generator were merged into one single device.

In still further embodiments, with the aid of the second electrical voltage, the time period required for the complete relaxation from the reorientation induced by the first electrical voltage is generally from about 99% to about 1%, or shorter, as compared to that without the aid of the second electrical voltage. "Complete relaxation" is herein defined as that state wherein the liquid crystal is back to the initial orientation imposed by the elastic forces and the surface anchoring forces, in the absence of the electric field.

Without the intention to be bound by any particular theory, it is believed that various embodiments of the present invention take advantage of the following scenario. In this scenario the dielectric dispersion in liquid crystals, such as uniaxial nematic liquid crystals, affects the switching dynamics of the director, as the dielectric torque is determined by not only the present values of the electric field (i.e. that induced by the second electrical voltage) and director, but also by the past values of the electric field (i.e. that induced by the first electrical voltage). This "dielectric memory" leads to an unusual contribution to the dielectric torque that is linear (rather than quadratic) in the present E. This torque can be used to accelerate the "switch-off" phase of director dynamics with the second electrical voltage, for example, a properly chosen back edge of the electric pulse. As a result, the "switch-off" phase becomes "active" and is no longer a "passive" process.

In various embodiments, the direction of the torque can be controlled by the polarity of E, regardless of the sign of $\Delta\epsilon$. Without the intention to be bound by any particular theory, when a first electrical voltage such as a positive dc field $E_z>0$ applies on a liquid crystal such as a NLC with $\Delta\epsilon>0$ in a planar cell, it reorients $\hat{n}$ towards the z-axis. $E_z$ also induces a dipole moment density p with the components $p_\perp=\epsilon_\perp E_z \sin\theta$ and $p_\parallel=\epsilon_{h\parallel}E_z \cos\theta+p_{mem}$, perpendicular and parallel to $\hat{n}$, respectively. Here $p_{mem}$ is the "memory" contribution that saturates to the value $p_{mem}=(\epsilon_{l\parallel}-\epsilon_{h\parallel})E_z \cos\theta$ after the dc field $E_z$ has acted for a sufficiently long time $>\tau$. $p_{mem}>0$ and $E_z>0$ are of the same sign. When the field is switched off at t=0, $p_{mem}>0$ does not disappear instantaneously, but decays with a characteristic time $\tau$. If within the interval $0<t\leq\tau$, one applies a second electrical voltage such as a new electric pulse of the opposite polarity, then this field $E_z<0$ would interact with the decaying $p_{mem}>0$ to assist the relaxation or reorientation towards the planar state, $\theta\rightarrow\pi/2$.

Similarly, in the homeotropic cell with a negative NLC, the field $E_z>0$ at t<0 also induces $p_{mem}>0$ (of the same polarity). If a second electrical field such as a new voltage pulse of the same polarity, $E_z>0$, is applied within the interval $0\leq t\leq\tau$, then this field will couple to $p_{mem}>0$ to assist the director relaxation or reorientation into the homeotropic state, $\theta\rightarrow 0$.

In preferred embodiments of the invention, the liquid crystal is dispersive. For example, if the NLC were not dispersive, any field-induced polarization would relax instantaneously, $p_{mem}=0$, $\epsilon_{l\square}=\epsilon_{h\square}$ and $\tau=0$, and the effect would not be observed.

The mechanism of the invention will be explained in detail, however, that should not be interpreted as the invention being bound by the particular theory. Due to dielectric relaxation, electric displacement D(t) and the torque $M_d(t)=D(t)\times E(t)$ depend on both the present E(t), and the past field E(t'), $-\infty<t'\leq t$, according to Y. Yin, et al. Phys. Rev. Lett. 95, 087801 (2005); and M. Gu, et al., Phys. Rev. E 76, 061702, (2007). Many NLCs experience only a single relaxation process at f<10 MHz that can be described by the Debye model:

$$\varepsilon_{\|}(f) = \varepsilon_{h\|} + \frac{\varepsilon_{l\|} - \varepsilon_{h\|}}{1 - i2\pi f \tau}, \quad (1)$$

$$\varepsilon_{\perp}(f) = \varepsilon_{\perp} = const,$$

wherein "l" and "h" refer to the low and high f, and $\tau$ is the dielectric relaxation time.

In embodiments of the invention, two Debye type materials with different (but f-independent) signs of $\Delta\varepsilon$ with dielectric relaxation in the kHz region have been tested, although the invention can be applicable for other parts of the spectrum as well. The negative $\Delta\varepsilon<0$ NLC sample was obtained by mixing 60.6 wt % MLC-7026-100 (EM Industries) and 39.4 wt % 2F-3333 (Rolic Technologies). The positive $\Delta\varepsilon>0$ NLC sample was a mixture of 20.0 wt % of pentylcyanobiphenyl (also known as 5CB, EM Industries) and 80.0 wt % 2F-3333. The dielectric permittivities were measured using a Schlumberger 1260 impedance/gain-phase analyzer. FIG. 1 shows the dielectric dispersion of two NLCs, with $\Delta\varepsilon<0$ (a) and $\Delta\varepsilon>0$ (b). The data for $\varepsilon_{\|}$ are fitted by Eq. (1) with $\varepsilon_{l\|}$=6.60, $\varepsilon_{h\|}$=3.91, $\varepsilon_{\perp}$=7.31 and $\tau$=33 µs (a); $\varepsilon_{l\|}$=15.21, $\varepsilon_{h\|}$=8.67, $\varepsilon_{\perp}$=7.88 and $\tau$=200 µs (b).

The director dynamics are determined by the balance of the dielectric $M_d$, viscous $M_v$, and elastic $M_e$ torques through the Ericksen-Leslie equation $M_d + M_v + M_e = 0$. For a flat cell with plates along the x-y plane, $E(t)=E_z(t)\hat{z}$, $\hat{n}(t)$ in the x-z plane depends only on z, the only non-zero components of torques are along the y-axis. According to Y. Yin, et al. Phys. Rev. Lett. 95, 087801 (2005), the dielectric torque is $$M_d(t) = \varepsilon_0 E(t) \sin\theta(t) \left[ \begin{array}{c} \Delta\varepsilon_h E(t)\cos\theta(t) + \frac{\varepsilon_{l\|} - \varepsilon_{h\|}}{\tau} \\ \int_{-\infty}^{t} \exp\left(-\frac{t-t'}{\tau}\right) E(t')\cos\theta(t')dt' \end{array} \right], \quad (2)$$

where $\theta(t)$ is the angle between $\hat{n}(t)$ and $E(t)$. For $\varepsilon_{l\|} = \varepsilon_{h\|} = \varepsilon_{\|}$, Eq. (2) recovers the classic "instantaneous" dielectric response theory.

The torque balance is in response to a voltage change over a short time interval between t=0 and t~$\tau$, and this interval is short enough to assume the changes of $\theta(t)$ are small. This allows one to approximate $\theta(z,t) \approx \theta(z,t=0) = \theta_0(z)$ in Eq. (2) (providing $\theta_0(z) \neq 0, \pi/2$) and to consider as time independent (a) the elastic torque $M_e(z,t) = M_e(z)$ and (b) the spatial non-uniformity of the electric field, $E_z(z,t) = g(z)U(t)$, where g(z) is a proportionality factor. The back-flow effect is neglected, thus $M_v(t) = \gamma_1 d\theta(t)/dt$. Under these assumptions, the solution of the Ericksen-Leslie equation is $$\theta(t) = \theta_0(z) - \Theta(z)Q + M_e(z)t$$

where $\Theta(z) = \varepsilon_0 (\varepsilon_{l\|} - \varepsilon_{h\|}) \tau U_0^2 g^2(z) \sin 2\theta_0(z) / \gamma_1$ and Q is the normalized integrated dielectric torque:

$$Q = \tau^{-1} \int_0^{\tau} \left\{ \xi u^2(t') + u(t') \left\{ \int_0^{t'} \frac{u_{mem}\exp(-t'/\tau) + \tau^{-1}}{\exp[-(t'-t'')/\tau]u(t'')dt''} \right\} \right\} dt'. \quad (3)$$

Here $\xi = (\varepsilon_{h\|} - \varepsilon_{\perp})/(\varepsilon_{l\|} - \varepsilon_{h\|})$, $u(t) = U(t)/U_0$ is the normalized voltage with $U_0 = U(t \to 0^-)$ being the voltage that acts just before the "switch-off" moment t=0, and $$u_{mem} = \tau^{-1} \int_{-\infty}^{0} \exp(t'/\tau) u(t') dt'$$

being the memory term caused by the "past" field or the first field.

A direct variational method can be applied to optimize Q. Integrating Eq. (3) with a decaying exponential probe function $u(t) = a \exp(-\Gamma t/\tau)$, where a and $\Gamma>0$ are two variational parameters, one can obtain:

$$Q = \frac{a[2u_{mem}\Gamma + a(1 + \xi + \xi\Gamma)]}{2\Gamma(1 + \Gamma)} - \quad (4)$$

$$\frac{a^2(1 + \xi - \xi\Gamma)}{2\Gamma(\Gamma - 1)} e^{-2\Gamma t/\tau} + \frac{a[u_{mem}(\Gamma - 1) + a]}{\Gamma^2 - 1} e^{-(1+\Gamma)t/\tau}$$

The last expression can be used to fit the data below. In Eq. (4), the first term dominates for large t>5$\tau$ and determines the saturated value of Q. Its extremum $Q_e = u_{mem}^2 \{[(1+\xi)\xi]^{1/2} - \xi - \frac{1}{2}\}$ is reached for $\Gamma_e = (1+\xi^{-1})^{1/2}$ and $a_e = u_{mem}(1 - \Gamma_e)$. One can see that $Q_e<0$ for the positive NLCs in which $\xi>0$, while $Q_e>0$ for the negative NLCs in which $\xi<-1$. The $Q_e$ is opposite in sign to the dielectric torque in the switch on phase, thus it can accelerate the director relaxation in the switch off phase.

Homeotropic and planar (with a small pretilt of ~1°) cells (EHC Ltd.) comprised of glass substrates with indium tin oxide electrodes of area 10×10 mm$^2$ were used to demonstrate the effect of the invention. d=14.4 µm for the homeotropic cell and d=20.6 µm for the planar cell. The field-induced director dynamics was monitored by measuring the He—Ne laser ($\lambda$=633 nm) light transmission I(t)=A sin$^2(\Phi/2)$ through the cells placed between two crossed polarizers, as disclosed in D.-K. Yang and S. T. Wu, *Fundamentals of Liquid Crystal Devices* (John Wiley, New York, 2006). The phase retardation $\Phi$ depends on $\theta$; for small variations of $\theta$, the retardation change is linear in Q, $\Phi - \Phi_0 \approx \rho Q$, where $$\Phi_0 = \frac{2\pi n_o}{\lambda} \int_0^d \left\{ \frac{n_e}{\tilde{n}(z)} - 1 \right\} dz, \quad (5)$$

$$\rho = \frac{\pi n_o n_e (n_e^2 - n_o^2)}{\lambda} \int_0^d \frac{\Theta(z)\sin 2\theta_0(z)}{\tilde{n}(z)^3} dz,$$

and $\tilde{n}(z) = [n_o^2 \sin^2\theta_0(z) + n_e^2 \cos^2\theta_0(z)]^{1/2}$. The coefficient A is close to the intensity $I_0$ of the impinging light for the planar cell when the rubbing direction is at 45° with respect to the polarizers, according to D.-K. Yang and S. T. Wu, *Fundamentals of Liquid Crystal Devices* (John Wiley, New York, 2006). In the homeotropic cell, $A \approx I_0/2$ because the applied field creates random azimuthal orientation of $\hat{n}$ with numerous umbilics, 10-100 within the area probed by the beam. The umbilics relax much slower (seconds and minutes according to M. Gu, I. I. Smalyukh and O. D. Lavrentovich, Appl. Phys. Lett. 88, 061110 (2006)) than the duration of our experiments (<0.5 ms). I(t) was measured using a TIA-500S-TS photodetector (Terahertz Technologies) and Tektronix TDS 210 oscilloscope.

The driving pulses were produced by a WFG500 waveform generator (FLC Electronics); the maximum rate was 240 V/µs. To test the switch-off dynamics, two different profiles were used for the pulse's back edge: profile (i) which is an instantaneous back edge (in practice ~1 µs in duration because of the finite voltage change rate); and profile (e) which is an exponentially decaying back edge $u(t)=a \ \mathrm{Exp}(-\Gamma t/\tau)$.

Figure 2:
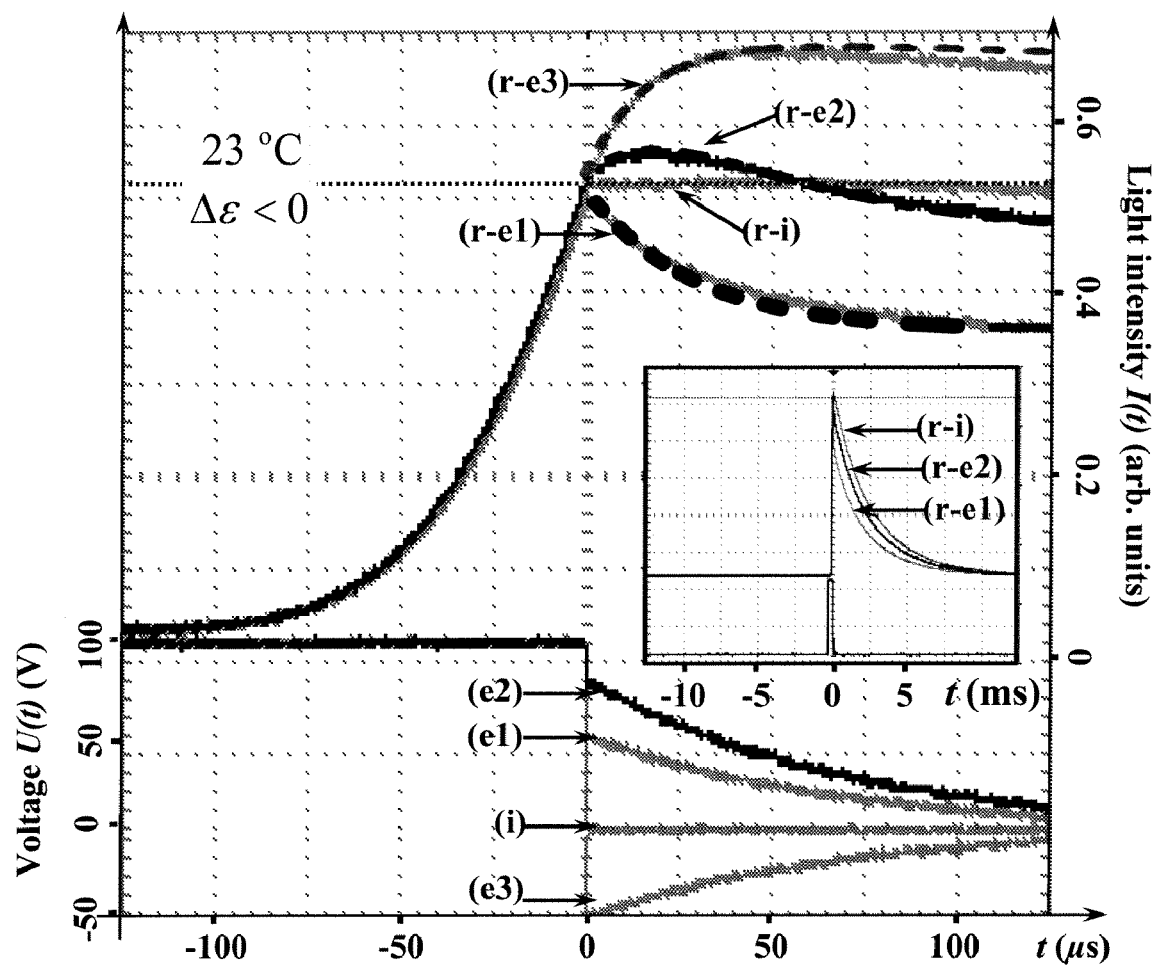
FIG. 2 shows the electrooptic response of a nematic liquid crystal sample with negative dielectric anisotropy $\Delta\epsilon$ in a homeotropic cell driven by dc pulses with instantaneous and exponentially decaying back edges according to an embodiment of the invention.

To drive the homeotropic cell with a negative NLC, a square 100 V dc pulse of duration 225 µs, much longer than $\tau=33$ µs, was first applied as shown in FIG. 1, panel (a), so that there is enough time to produce the saturated "memory" dipole moment ($u_{mem} \rightarrow 1$). This pulse was switched off by an instantaneous back edge (i) or by three different exponential edges with $\Gamma=0.45$ and: (e1) positive polarity, a=0.5; (e2) a=0.87; (e3) negative polarity, a=−0.5. FIG. 2 shows the electrooptic response I(t) of the $\Delta\epsilon<0$ NLC in the homeotropic cell driven by dc pulses with an instantaneous (i) and exponentially decaying back edges (e1-e3). In FIG. 2, "r" stands for "response"; the dashed lines show I(t) simulated using Eqs. (4) and (5); and the inset shows I(t) over a large time scale.

As demonstrated in FIG. 2, the optical response is different in all four cases. In the case (i), n̂ reorients slowly toward the homeotropic state $\theta \rightarrow 0$, as evidenced by the decrease in I(t) in the FIG. 2 inset. The pulse (e1) produces much faster reorientation (r-e1), despite the fact that U decreases less abruptly as in case (i). The shape of the pulse (e1) is close to the optimum, as any departure from the pre-selected a=0.5 and $\Gamma=0.45$ causes a slower or even a non-monotonous response, as in the (e2) case. The linear E-dependence of the "memory" torque is well illustrated by the response to pulses (e1) and (e3) that are identical in amplitude and duration and differ only in polarity: (e1) drives n̂ toward $\theta=0$ while (e3) continues to drive n̂ toward $\theta=\pi/2$. After a sufficiently long time, the NLC relaxes to the same homeotropic state with I=0 for all pulses.

The different cases in FIG. 2 were fitted by the model as described above. The approximation $\Phi - \Phi_0 \approx \rho Q(t)$, Eq. (5) was used to fit the data. The only fitting parameter is $\rho$, as Q(t) is determined by the experimental values of a and $\Gamma$, Eq. (4). The response curve (r-e1) was first fitted using a=0.5, $\tau=33$ µs and $\Gamma=0.45$ and it was found $\rho=2.33$. With this value of $\rho$, and with the experimental $\tau$, a and $\Gamma$, the model (4) reproduces the measured curves (r-e2) and (r-e3) very well with no fitting parameters.

Figure 3:
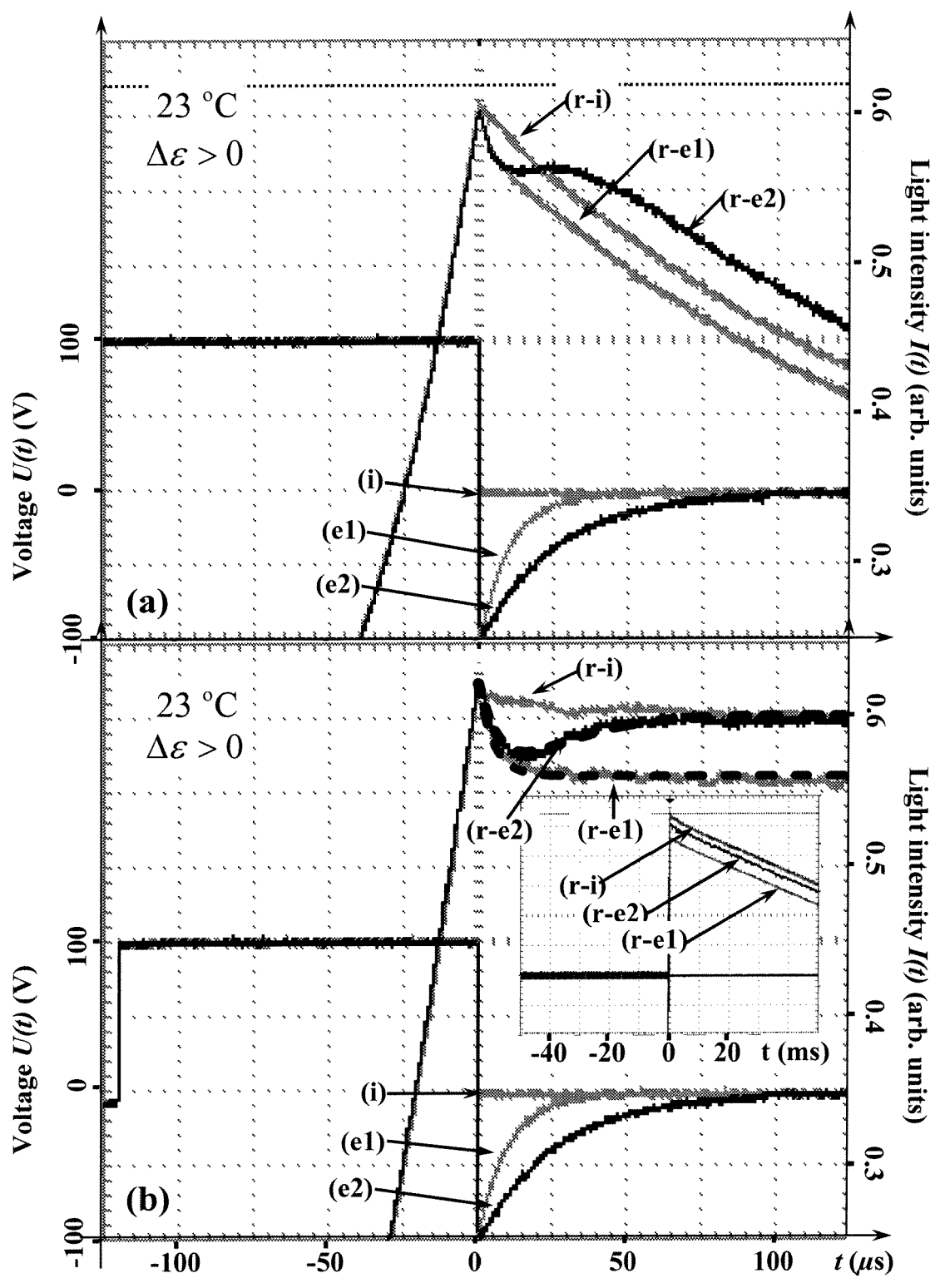
FIG. 3 shows the electrooptic response of a nematic liquid crystal sample with positive dielectric anisotropy $\Delta\epsilon$ in a planar cell driven by dc pulses with instantaneous and exponentially decaying back edges according to an embodiment of the invention.

For the planar cell with the positive NLC, a 100 V dc pulse of duration 120 µs was used as the first electrical voltage. The back edge was either (i) instantaneous or (e) exponential $u(t)=a \ \mathrm{Exp}(-\Gamma t/\tau)$, with a negative a=−1, $\tau=20$ µs and two different decaying speeds, $\Gamma=2$ (e1) and $\Gamma=0.75$ (e2). FIG. 3 shows the electrooptic response I(t) of the $\Delta\epsilon>0$ NLC in the planar cell driven by the dc pulses with an instantaneous (i) and exponentially decaying back edges (e1, e2). In FIG. 3 panel (a) [or FIG. 3(a)], the cell was driven by a dc pulse of duration 310 µs. In panel (b), the cell was driven by a 5 V, 1 kHz ac pulse of duration 180 ms, followed by a dc pulse of duration 120 µs. The inset in FIG. 3 shows a larger time scale. The dashed lines show I(t) simulated using Eqs. (4) and (5).

The optical responses in FIG. 3(a) share one common feature, namely, an overall decay with a characteristic time of 0.5 ms. This time is much shorter than the elastic relaxation time, $\tau_{off} \approx 0.4$ s for a typical $\gamma_1 \sim 0.1$ kg m$^{-1}$s$^{-1}$ as taught in D.-K. Yang and S. T. Wu, *Fundamentals of Liquid Crystal Devices* (John Wiley, New York, 2006), but is close to the characteristic times of the back-flow effects as taught in O. P. Pishnyak, et al., Phys. Rev. Lett. 99, 127802 (2007), i.e. coupling of the director reorientation and mass flow as taught in D.-K. Yang and S. T. Wu, *Fundamentals of Liquid Crystal Devices* (John Wiley, New York, 2006). The overall decay can be suppressed by applying a long low-amplitude ac pulse that changes the director orientation prior to the high-voltage dc pulse [FIG. 3(b)] giving further evidence of the involvement of back-flow. The other possible reason, ionic currents, does not seem plausible, because the 0.5 ms overall decay behavior does not change when the dc pulse was replaced with two subsequent pulses of opposite polarities and half duration.

The difference between the response to pulses (i), (e1) and (e2) is most evident when the 0.5 ms overall decay is suppressed by a pre-addressed ac pulse as shown in FIG. 3(b): (e1) produces a much faster reorientation as compared to (i), while (e2) results in a non-monotonous behavior; (r-e1) and (r-e2) in FIG. 3(b) are well fitted with Eq. (4) as explained above, using the experimental a, $\tau=20$ µs and $\Gamma$ and the single fitting parameter $\rho=0.496$.

Figure 4:
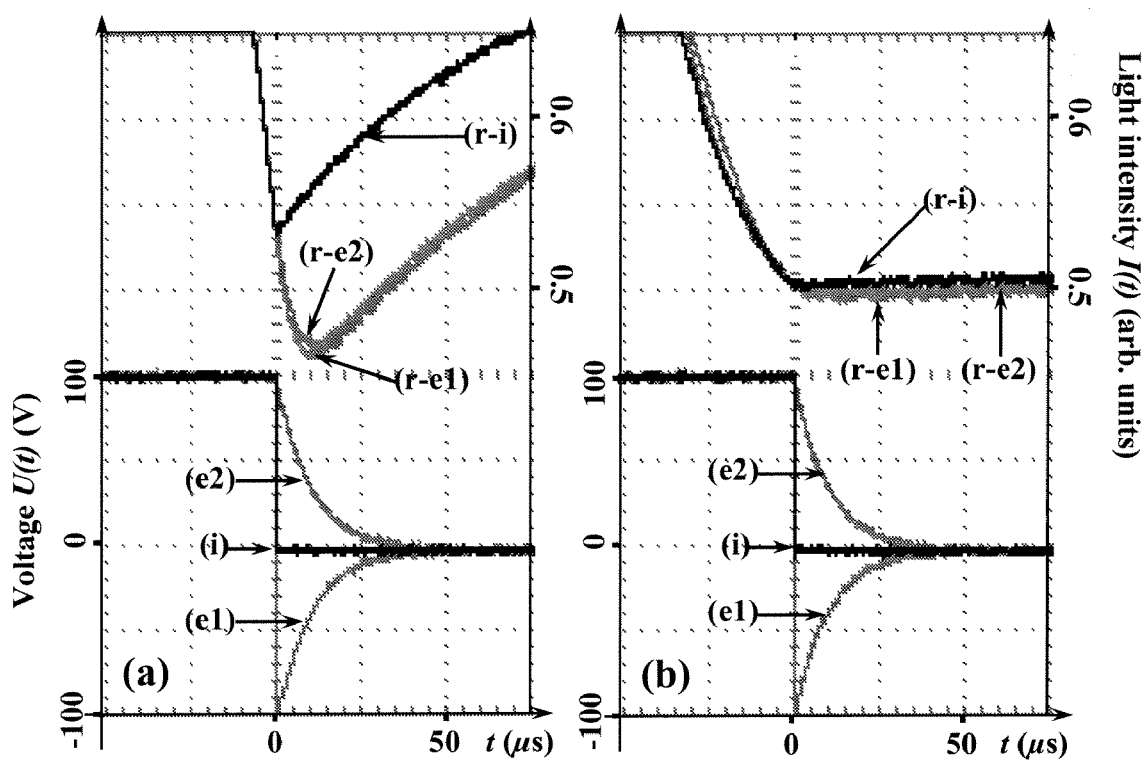
FIG. 4 shows the electrooptic response of a non-dispersive liquid crystal sample in a planar cell driven by dc pulses with instantaneous and exponentially decaying back edges.

In a control experiment, a planar cell was filled with 5CB, in which $\epsilon_\square$ experiences relaxation with $\tau \approx 50$ ns according to H.-G. Kreul, S. Urban, and A. Würflinger, Phys. Rev. A 45, 8624 (1992). Such a short $\tau$ was not expected to lead to any observable DME with the typical 1 µs time of voltage changes. FIG. 4 shows the electrooptic response I(t) of 5CB in the planar cell driven by dc pulses with an instantaneous (i) and exponentially decaying back edges (e1, e2) of opposite polarity. In panel (a), the cell was driven by a dc pulse of duration 121 µs; and in panel (b), the cell was driven by a 5 V, 1 kHz ac pulse of duration 180 ms (not shown), followed by a dc pulse of duration 80 µs.

As expected, FIG. 4 shows that two (e)-pulses with the same amplitude |a|=1 and duration $\tau/\Gamma=10$ µs, but of opposite polarity, produced the same positive torque. This feature was observed regardless of whether the cell was pre-addressed with the ac pulses to suppress the overall decay as in FIG. 4(b), or not, as in FIG. 4(a). Such a behavior is consistent with the non-dispersive character of 5CB in the kHz range and with the classic instantaneous model with dielectric torque quadratic in E. It is clearly different from the behavior of a dispersive NLC that is sensitive to the polarity of the driving pulses such as FIG. 2.

According to the invention, dielectric response in a NLC with dielectric dispersion is sensitive to the polarity of the applied voltage. The effect is caused by a special "memory" term in the dielectric torque $M_d(t)$ that is linear in the present field E(t), in contrast to a regular contribution that is quadratic in E(t). The invention takes advantage of this feature and is used for optimization of electrooptical effects in NLCs. For example, the "switch-off" phase of director reorientation can be accelerated by exponentially decaying short pulses of a proper polarity with the duration determined by $\tau$.

In some embodiments of the invention, linear in E(t) character of the "memory" dielectric torque in a dispersive NLC is used to interplay with other field effects, such as flexoelectricity, order electricity, surface polarization, etc. For example, FIG. 3 suggests that the hydrodynamic processes in the NLC cells are also coupled to the DME, as the relaxation behavior changes when the "overall decay" trend is suppressed.

Figure 5:
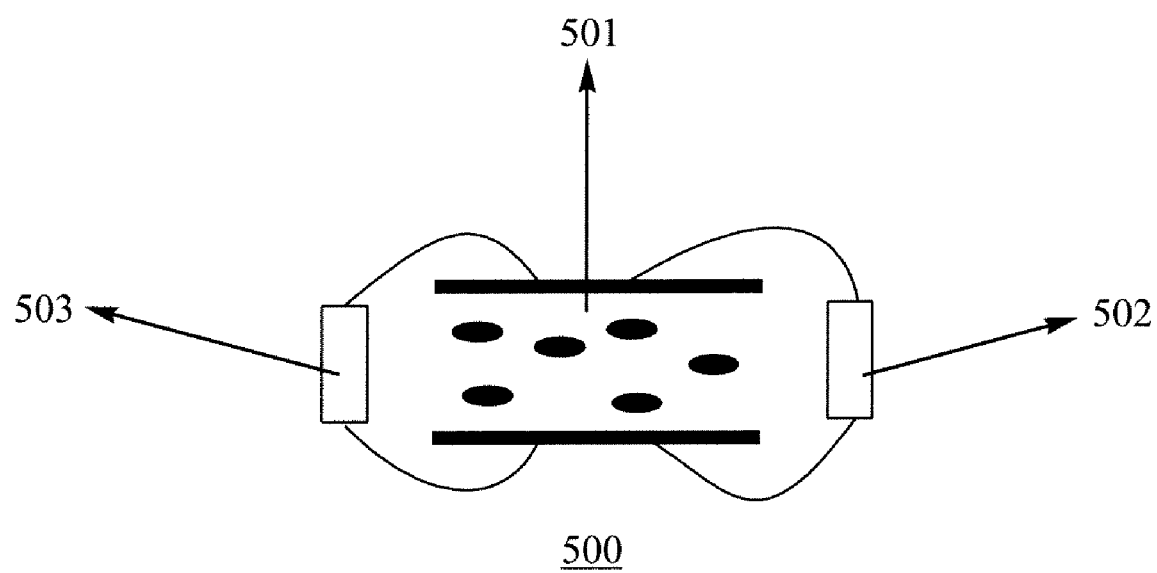
FIG. 5 is a schematic drawing of a device according to an embodiment of the invention.

The present invention provides a liquid crystal device comprising a liquid crystal cell, a first electrical voltage generator, and a second electrical voltage generator, wherein said first electrical voltage generator generates a first electrical voltage which applies on the liquid crystal to induce a reorientation of the liquid crystal; and said second electrical voltage generator generates a second electrical voltage which applies on the liquid crystal and assists the liquid crystal to relax from the reorientation induced by the first electrical voltage. With reference to FIG. 5 which schematically illustrates a part 500 in such a device, a first electrical voltage generator 502 generates a first electrical voltage which applies on the liquid crystal in a liquid crystal cell 501 to induce a reorientation of the liquid crystal. A second electrical voltage generator 503 generates a second electrical voltage which applies on the liquid crystal and assists the liquid crystal to relax from the reorientation induced by the first electrical voltage. The first electrical voltage generator 502 and the second electrical voltage generator 503 may be merged into one single device. The first electrical voltage generator 502, the second electrical voltage generator 503, or a single device as a combination of 502 ad 503 may be selected from, for example, a pulse generator, a function generator, and a wave-form generator. The structural part 500 may be adapted to various liquid crystal devices such as LCD, LC shutter, LC lens, spatial light modulator, telecommunication device, tunable filter, beam steering device, and electrically driven LC device.

Some exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for accelerating the reorientation of the liquid crystal in a liquid crystal cell comprising:
   (1) applying a first electrical voltage on the liquid crystal to polarize the liquid crystal in an "ON" state and induce a memory polarization of the liquid crystal, the first electrical voltage being applied from a first electrical voltage generator,
   (2) removing the first electrical voltage to induce a time of dielectric relaxation of the liquid crystal from the reorientation induced by the first electrical voltage, and
   (3) applying a second electrical voltage on the polarized liquid crystal to assist the relaxation, the second electrical voltage being applied from a second electrical voltage generator, wherein the second electrical voltage is applied during the time of dielectric relaxation of the liquid crystal and acts on the memory polarization to accelerate reorientation of the liquid crystal to an "OFF" state.

2. The method according to claim 1, in which the liquid crystal is dielectrically dispersive.

3. The method according to claim 1, in which the liquid crystal comprises a nematic liquid crystal.

4. The method according to claim 1, in which the liquid crystal cell is selected from homeotropic cell, planar cell, and high pretilt cell.

5. The method according to claim 1, in which the first electrical voltage is a pulse.

6. The method according to claim 1, in which the liquid crystal has a negative dielectric anisotropy $\Delta\epsilon$, and the polarity of the first electrical voltage and the polarity of the second electrical voltage are the same.

7. The method according to claim 1, in which the liquid crystal has a positive dielectric anisotropy $\Delta\epsilon$, and the polarity of the first electrical voltage and the polarity of the second electrical voltage are opposite.

8. The method according to claim 1, in which the time span between the step of removing the first electrical voltage and the step of applying the second electrical voltage is substantially zero.

9. The method according to claim 1, in which the liquid crystal is a nematic liquid crystal with negative dielectric anisotropy $\Delta\epsilon$.

10. The method according to claim 9, in which the liquid crystal comprises a mixture of MLC-7026-100 and 2F-3333.

11. The method according to claim 1, in which the liquid crystal is a nematic liquid crystal with positive dielectric anisotropy $\Delta\epsilon$.

12. The method according to claim 11, in which the liquid crystal comprises a mixture of 5CB and 2F-3333.

13. The method according to claim 1, in which the step of removing the first electrical voltage and starting of the application of the second electrical voltage is accomplished with the back edge of the first electrical voltage pulse.

14. The method according to claim 13, in which the back edge is an instantaneous back edge or an exponentially decaying back edge.

15. A liquid crystal device comprising:
    a liquid crystal cell, a first electrical voltage generator, and a second electrical voltage generator, wherein said first electrical voltage generator generates a first electrical voltage which applies on the liquid crystal to polarize the liquid crystal in an "ON" state and induce a memory polarization of the liquid crystal; and
    said second electrical voltage generator generates a second electrical voltage which applies on the liquid crystal during a time of dielectric relaxation of the liquid crystal induced by removal of the first voltage and accelerates reorientation of the liquid crystal from the "ON" state induced by the first electrical voltage to an "OFF" state.

16. The device according to claim 15, in which the liquid crystal comprises a nematic liquid crystal.

17. The device according to claim 15, in which the liquid crystal has a negative dielectric anisotropy $\Delta\epsilon$, and the polarity of the first electrical voltage and the polarity of the second electrical voltage are the same.

18. The device according to claim 15, in which the liquid crystal has a positive dielectric anisotropy $\Delta\epsilon$, and the polarity of the first electrical voltage and the polarity of the second electrical voltage are opposite.

19. The device according to claim 15, in which the first electrical voltage generator and the second electrical voltage generator are merged into one single device selected from a pulse generator, a function generator, and a wave-form generator.

20. The device according to claim 15, which is selected from LCD, LC shutter, LC lens, spatial light modulator, telecommunication device, tunable filter, beam steering device, and electrically driven LC device.

* * * * *